United States Patent Office 2,951,800
Patented Sept. 6, 1960

2,951,800
PHOTOXIDATION PROCESSES UTILIZING IMPROVED CATALYSTS

Dexter B. Sharp, Vandalia, Ohio, assignor to Monsanto Chemical Company, St. Louis, Mo., a corporation of Delaware No Drawing. Filed Nov. 13, 1957, Ser. No. 696,065

7 Claims. (Cl. 204—162)

The present invention is directed to photoxidation processes utilizing benzoporphyrins as photoxidation catalysts. The invention is further directed to the photoxidation of olefins in the presence of benzoporphyrins. The compounds suitable for use can be represented by the formula:

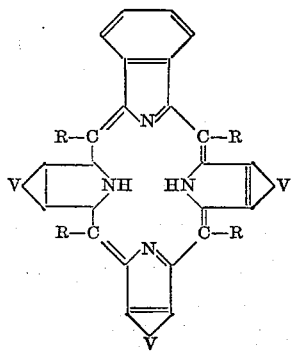

in which R can be hydrogen, alkyl, or phenyl radicals and in which each V is an organic residue completing a benzo group, or represents two hydrogen atoms bound to the β-positions of the pyrrole ring. The benzo groups in the benzoporphyrins can contain various substituents, as exemplified, for example, by chlorobenzo, dichlorobenzo, methylbenzo, N,N-dimethylaminobenzo, hydroxybenzo, 1,2-naphtho, 2,3-naphtho, etc., or any other benzo groups. In addition, the benzo groups in the photosensitizing catalysts can have any or a combination of such substituents as alkyl groups, for example, methyl, ethyl, propyl, isopropyl, butyl, isobutyl, secondary butyl, tertiary butyl, n-amyl, isoamyl, tertiary amyl, n-hexyl, decyl, dodecyl, etc.; alkoxy substituents, for example, methoxy, ethoxy, isopropoxy, butoxy, hexyloxy, etc.; halogen substituents, for example, bromine, chlorine, fluorine, and iodine; and any other substituents which do not change the fundamental aromatic character of the groups. The meso-carbon atoms in the benzoporphyrin catalysts can be bonded to hydrogen, or can contain such substituents as alkyl groups, for example, methyl, ethyl, propyl, isopropyl, butyl, isobutyl, t-butyl, pentyl, hexyl, etc.; or phenyl groups, for example, phenyl itself or substituted in the manner hereinbefore described with respect to the benzo groups.

While the presence of any one or more of the above or other aryl groups at the designated positions in the porphyrin leads to activity as a photoxidizing catalyst, it is preferred to utilize four benzo groups in the catalysts. The tetrabenzo porphyrins are more readily prepared, and also generally have greater photoxidizing activity than do catalysts containing a smaller number of benzo substituents. Tetrabenzoporphin is a very effective photoxidation catalyst.

The porphyrins, of course, are the class of compounds in which four pyrrole nuclei are linked together in a circular pattern by four carbon atoms so that a great ring containing 16 atoms is formed. While the formulae herein depict the unsaturated porphyrin ring system in conventional manner, it will be recognized that the double-bonds are capable of shifting to various resonance states and that the photosensitizing use of the catalysts described herein is contemplated by the present invention, regardless of what the actual predominant resonance state may be.

It will be understood that the use of the metal chelate forms of the above structure is also included in the present invention. Such metals as, for example, zinc, magnesium, copper, iron, nickel, cobalt, lead, etc. can readily be chelated with porphyrins, and the resulting chelates are effective as photosensitizers. The chelates can be represented by the above porphyrin structure, with the following bonding between the metal and the pyrrole nitrogens:

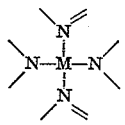

Various other metals also form chelates of the described porphyrins which are effective as catalysts, for example, alkali and alkaline earth metals such as sodium, potassium, calcium, etc. It will be understood that when porphyrins are described or claimed herein, generically or specifically, by structural formula or otherwise, the metal chelate forms as well as the free bases are contemplated.

The prior art discloses the use of chlorophyll as a catalyst in certain photoxidation procedures. However, chlorophyll does not have the structure of the catalysts used in the present invention and is far inferior in activity and stability to the catalysts of the present invention.

It is an object of the present invention to improve the efficiency and yields in photoxidation reactions by the use of superior photosensitizing catalysts. It is a further object to render photoxidation procedures more practical and economical by the use of photosensitizers of improved stability. It is a further object to employ photosensitizers having good solubility in organic substrates. It is a further object to utilize superior photosensitizers which can be prepared by procedures of organic synthesis.

The terms "photoxidizing," "photoxidation," "photosensitized," etc. as used herein in the specification and claims are intended to cover true photosensitized oxidation reactions in which light in the presence of a photosensitizing catalyst causes the oxidation; the terms are not intended to include autoxidations, or oxidations proceeding by a free radical mechanism in which irradiation with light serves to initiate free radicals. The true photosensitized oxidation reactions are characterized by the fact that the rate of the reaction is proportional to the intensity of irradiation at both high and low intensities and the fact that ordinary oxidation inhibitors do not retard the reaction.

The photoxidation reaction of the present invention can be postulated according to the following equations:

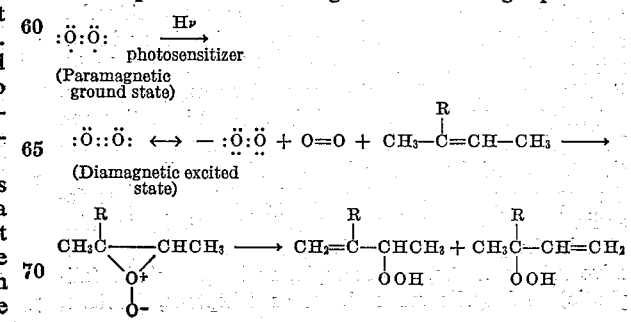

In these reactions a photosensitizer must be present to catalyze the conversion of the molecular oxygen in the ground state to an activated polarizable state. Light is also necessary to effect this reaction. The irradiating light can vary considerably in wave length, wave lengths in the visible regions being preferred. The light can be monochromatic or polychromatic. Light of wave lengths in the range of about 3600 to about 8000 Angstroms has been found very suitable. While light in the ultraviolet region, particularly the near ultraviolet region, can be used as it is effective to some extent in causing photoxidation, it is desirable to avoid use of light in these regions as it tends to catalyze autooxidations and other free-radical type reactions. High-energy ultraviolet light may also cause accelerated catalyst photo-decomposition. The speed of the photoxidation reaction is proportional to the intensity of the irradiation; this relationship is very important, as it makes it possible to obtain reaction rates suitable for commercial production by merely providing high power light sources.

The amount of benzo porphyrin photosensitizer can vary widely, but ordinarily only small "catalytic" amounts will be used. For example, amounts of 0.005% by weight based on the weight of substrate are satisfactory. Various other amounts, for example, from about 0.0001% up to about 1% or more by weight of substrate such as propylene trimer or other olefin can be used. The photoxidation will generally be conducted in the absence of solvent. However, various organic solvents can be used for the reaction, and even water may be present during the reaction. The use of solvent will be advantageous in some cases to aid the mutual intersolubility of substrate and particular benzo porphyrin photosensitizers. Examples of a few suitable solvents are aromatic hydrocarbons, such as benzene, toluene, etc.; acylic and cyclic alkanes, for example, n-hexane and cyclohexane; amines, for example, pyridine, etc. Temperature does not have a strong influence on the photoxidation reaction. However, it is desirable to keep the substrate in the liquid or solution state, usually by temperatures below the boiling point at atmospheric pressure. Temperatures of the order of room temperature, for example, 20° to 30° C., will generally be used. Other temperatures, for example, from below 0° to 100° C. or higher can be used; if desired, the reaction can be conducted at superatmospheric pressures to maintain the liquid state at higher temperatures.

The rate of oxygen addition during the photoxidation can vary greatly, although it may affect the time required to complete the reaction. Generally, the addition rate will be at least sufficient to provide all the oxygen which can be absorbed and utilized at a given time. Various types of agitators, mixers, and gas-liquid contact apparatus and procedures can be utilized to promote rapid absorption of oxygen by the substrate, thereby insuring a sufficiently high effective oxygen concentration; the concentration of oxygen can also be increased by use of pressure. Oxygen gas can be utilized as such, or it can be admixed with nitrogen or other gases. Air is an oxygen-containing gas which is very suitable for use in the photoxidation of substrate; it will be understood that the term "oxygen" as used in the present specification and claims includes molecular oxygen in air or in admixture with other gases, or dissolved in or admixed with liquids, or generated in situ, as well as oxygen per se.

The photoxidation process of the present invention can be applied to any photoxidizable substrates; the inventive feature of the process is essentially the discovery of the superior photosensitizing activity of the catalysts described herein, and this photosensitizing activity is valuable in the photoxidation of any substrates. Representative substrates are, for example, such open chain (aliphatic) and cyclic mono-olefins as 1-heptene, 1-octene, 1-dodecene, 1-hexadecene, diisobutylene, cyclopentene, 1-methyl-1-cyclopentene, cyclohexene, 1-methylcyclohexene, 1,2-dimethylcyclohexene, cyclooctene, α-pinene, dipentene, limonene, carvomenthene, terpinolene, propylene trimers, tetramers, pentamers, etc., all of which are photoxidized to hydroperoxides, presumably by means of an allylic shift as represented by:

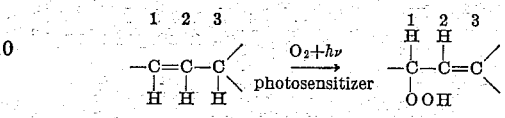

The hydroperoxide products can readily be reduced to alcohols, or used in other ways as organic intermediates for the production of useful compounds. The photoxidation process of the present invention converts cyclic conjugated dienes to endocyclic peroxides, and open chain conjugated dienes to exocyclic peroxides; representative of dienes which are so converted are, for example, cyclopentadiene, 1,3-cyclohexadiene, 2-methyl-1,3-cyclohexadiene, α-terpinene, α-phellandrene, α-pyronene, β-pyronene, 1,3-hexadiene, 1,3-dimethylbutadiene, 2,3-dimethylbutadiene, alloocimene, etc. Other substrates which can be photoxidized in the process of the present invention are, for example, amines; thioureas, for example, thiourea; dienes of the sterol series, for example, ergosterol; heterocyclic olefins, for example, furans; triolefins; olefinic acids, for example, oleic acid; fulvenes, for example, phenylfulvene; aldehydes; phenylhydrazones; semicarbazones, thiosemicarbazones, enol ethers, sulfinic acids, etc.; such groups as ester, amide, urethane, n-acetyl, phenyl, hydroxyl, Cl, Br, etc., even if adjacent to the oxidizable group in the foregoing types of substrates, do not ordinarily interfere in the photoxidation reaction. It will be appreciated, of course, that the foregoing substrates will vary in their ease of photoxidation, photoxidation rates, etc., and in the products resulting from photoxidation; such variations, however, do not effect the photosensitizing activity of the benzo porphyrin catalysts in the photoxidation reactions. It is evident from the foregoing, however, that the present process concerns introducing oxygen into the molecule of the organic compound without destruction thereof, i.e., actual addition of the oxygen to the compound, as a result of subjecting the organic compound capable of adding oxygen under the influence of light and a photosensitizing catalyst to simultaneous light irradiation and contact with oxygen and the benzo porphyrin catalysts employed in the present invention.

The propylene polymers referred to above are unsaturated olefins obtained by polymerization of propylene. In particular, propylene trimer used as the substrate, several examples below, was obtained by acid-catalyzed homoaddition of propylene to itself. The general method involves passage of propylene at superatmospheric pressure over a phosphoric acid-impregnated solid support at temperatures greater than 100° C., collecting the polymerized hydrocarbon and fractionating to isolate the trimer, tetramer, pentamer, etc., fractions. The trimer utilized herein was obtained from Enjay Company and has a boiling range of 260–290° F., and sp. gr. 20/20 of 0.736–0.740. A minimum of 100 p.p.m. t-butylcatechol is added as oxidation inhibitor. In early photoxidation runs, this was removed by adsorption, but the photoxidation proceeds equally as well in its presence or absence. The propylene pentamer used also was obtained from Enjay and has the following properties: Enjay "Pentadecene," sample No. 19–E–1, boiling point 249–268° C., API gravity of 60° F., 41.7. Propylene tetramer used was Enjay "Tetrapropylene" and has a boiling point of 350–445° F., sp. gr. 20/20 of 0.768–0.781.

The following examples illustrate certain embodiments of the invention, but the invention is not to be considered as limited thereto.

EXAMPLE 1

A conventional 20-unit Precision Scientific Warburg apparatus was provided with a double-circle, 5000-volt "standard cool white" fluorescent light especially fabricated to fit the apparatus. The light was immersed in the constant-temperature water bath to provide uniform illumination of the Warburg vessels from below. A 9-mg. amount of tetrabenzoporphin was dissolved and made up to a 10-ml. solution in pyridine. A 0.2-ml. portion of this solution was made up to 3 ml. with a 50:90 (by volume) mixture of propylene trimer and pyridine in a Warburg vessel. The oxygen uptake of the solutions was then measured in the Warburg apparatus in order to determine the photosensitizing activity of the catalysts. The tetrabenzoporphin was a very active photosensitizer, as shown by the following table comparing it to an active photosensitizer, tetraphenylporphin.

*Oxygen absorbed in microliters*

| Catalyst | Time in Minutes | | | |
|---|---|---|---|---|
| | 15 | 32 | 45 | 60 |
| Tetrabenzoporphin | 91 | 231 | 387 | 447 |
| Tetraphenylporphin | 93 | 237 | 330 | 452 |

Under comparable conditions, only 56 microliters of oxygen was absorbed in the presence of hemin.

EXAMPLE 2

The procedure of Example 1 was employed with the zinc chelate form of tetrabenzoporphin as catalyst. The oxygen absorption in microliters was as follows:

| Time (minutes): | Oxygen absorbed in microliters |
|---|---|
| 15 | 89 |
| 32 | 225 |
| 45 | 310 |
| 60 | 420 |

It is readily apparent that the zinc salt of tetrabenzoporphin has very good photosensitizing activity. Under comparable conditions a copper phthalocyanine complex caused absorption of only 118 microliters of oxygen.

In addition to its high photosensitizing activity, tetrabenzophorphin is readily soluble in organic substrates and is, therefore, especially valuable for use in such substrates.

The benzoporphyrins can be prepared by the reaction of phthalimides and zinc acetate (Helberger and Rebay, Ann., 536, 181 (1938)). In addition, the benzoporphyrins can be prepared by simple condensation of o-acylbenzonitriles as represented by (loc. cit.; cf. Linstead, J. Chem. Soc., 1937, 929; 1940, 1074):

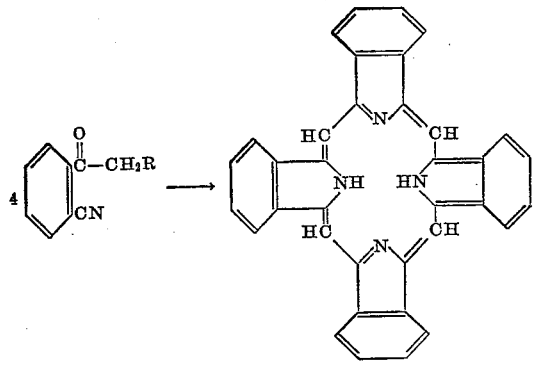

in which R can be hydrogen, phenyl groups, alkyl groups, or mixtures of the same. By reacting mixtures of o-acylbenzonitrile, pyrrole and an aldehyde, for example, benzaldehyde, in suitable proportions, it is possible to prepare porphyrins having 1 to 3 benzo groups. Similarly, 3,4-benzopyrolle (isoindole), alone, or along with other pyrroles, can be reacted with an aldehyde to prepare benzoporphyrins. Some examples of benzoporphyrins, other than those in the examples above, which can be used as photosensitizing catalysts in the process of the present invention are: $\alpha,\beta,\gamma,\delta$-tetraphenyltetrabenzoporphin, $\alpha,\beta,\gamma,\delta$-tetrakis(4-hydroxyphenyl)tetrabenzoporphin, dibenzo-meso-diphenylporphin, monobenzoporphin, dibenzoporphin, tribenzoporphin, tetranaphthoporphin, dibenzodinaphthoporphin, tetrabenzo-meso-tetramethylporphin, tetrakis(3,4-dichlorobenzo-$\alpha,\beta,\gamma,\delta$-tetrakis(2,3-dichlorophenyl)porphin, etc.

EXAMPLE 3

A quantity of tetrabenzoporphin for use as a photocatalyst was prepared as follows. Phthalimide, 50 grams, and 50 grams zinc acetate were charged to a 500-cc. flask, and the mixture was heated in a metal bath at 330–380° C. for about five hours (loc. cit., Helberger). The resulting black reaction product was ground in a mortar and washed with methanol. The washed solids were then extracted with acetone, and the acetone was evaporated from the extracts and the residue was taken up in chloroform. The chloroform solution was evaporated to about 100 ml. and chromatographed on activated alumina. A large dark green band appeared and was eluted in the fifth eluate fraction. A 1.5-gram portion of this zinc complex of tetrabenzoporphin was chromatographed again, and then treated with 100 ml. concentrated hydrochloric acid diluted with 20 ml. water and about 100 ml. chloroform and heated on a steam bath for about one-half hour. The solid material was collected by filtration, and spectral analysis indicated a change in structure from that of the zinc complex. The solids were taken up in chloroform, washed with water and then dilute ammonium hydroxide. The chloroform was evaporated and the residue was taken up in benzene and placed on a chromatographed column. A dark green band appeared on the column, but it could not readily be eluted with benzene. The dark green band was readily eluted with chloroform, however, to give 0.6 gram of tetrabenzoporphin, which was identified by absorption spectral analysis (loc. cit., Linstead).

Further discussion of the preparation of porphyrins appears in my copending application S.N. 696,063, filed of even date herewith. The photoxidation processes of the present invention can be applied to the photoxidation of any of the substrates utilized in the processes of the aforesaid copending application. In addition, the catalysts of the present invention can be utilized in various chelate forms in the manner illustrated by the activity of the chelate forms of the catalysts in the aforesaid copending application. The utility of the present catalysts is further demonstrated by their applicability in the preparation of isoprene as disclosed in the copending application of John R. Le Blanc and myself, Serial Number 696,062, filed of even date herewith.

What is claimed is:

1. A process for introducing oxygen into an organic compound which comprises simultaneously subjecting an organic compound capable of adding oxygen under the influence of light and a photosensitizing catalyst to light irradiation and contact with oxygen and a benzoporphyrin, thereby introducing oxygen into the molecule of the said organic compound without destruction thereof, the said benzoporphyrin having the structure

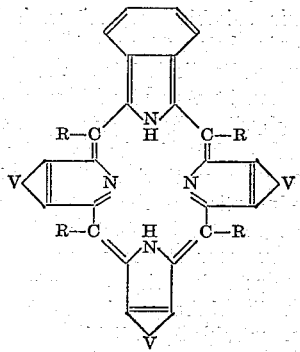

in which each V is selected from the group consisting of two separate hydrogen radicals and a bivalent organic residue completing a benzo group, and each R is selected from the group consisting of hydrogen, phenyl, and alkyl groups containing 1 to 6 carbon atoms.

2. The process of claim 1 in which the porphyrin has four benzo groups.

3. A process for introducing oxygen into an organic compound which comprises simultaneously subjecting an organic compound capable of adding oxygen under the influence of light and a photosensitizing catalyst to irradiation with light of wave length in the range of about 3600 to 8000 angstroms and contact with oxygen and tetrabenzoporphin, thereby introducing oxygen into the molecule of the said organic compound without destruction thereof.

4. The process of claim 1 in which the organic compound is contacted with air.

5. The process of claim 3 in which an olefin is oxidized to a peroxide.

6. The process of claim 3 in which an aliphatic monoolefin is converted to an aliphatic hydroperoxide.

7. A process of photoxidizing propylene trimer to its hydroperoxide which comprises irridiating olefin comprising propylene trimer with light from a source of at least 1000 watts and of wave length of 3600 to 8000 angstroms and contacting the said olefin with oxygen and tetrabenzoporphin, thereby introducing oxygen to form the said hydroperoxide.

References Cited in the file of this patent

UNITED STATES PATENTS

| | | |
|---|---|---|
| 2,165,130 | Coe | July 4, 1939 |
| 2,732,337 | Togel | Jan. 24, 1956 |